United States Patent
Kim et al.

(10) Patent No.: US 10,908,637 B2
(45) Date of Patent: Feb. 2, 2021

(54) DISPLAY DEVICE

(71) Applicant: Samsung Display Co., LTD., Yongin-si (KR)

(72) Inventors: Youngji Kim, Jeju-si (KR); Minsu Jung, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/422,058

(22) Filed: May 24, 2019

(65) Prior Publication Data

US 2020/0064881 A1 Feb. 27, 2020

(30) Foreign Application Priority Data

Aug. 27, 2018 (KR) .................. 10-2018-0100226

(51) Int. Cl.
*G06F 1/16* (2006.01)
*G09F 9/30* (2006.01)

(52) U.S. Cl.
CPC .............. *G06F 1/1601* (2013.01); *G09F 9/30* (2013.01)

(58) Field of Classification Search
None
See application file for complete search history.

(56) References Cited

U.S. PATENT DOCUMENTS

| | | | |
|---|---|---|---|
| 6,833,288 B2 | 12/2004 | Kang et al. | |
| 7,413,790 B2 * | 8/2008 | Hutter, III | H01R 4/04 174/5 R |
| 8,547,497 B2 * | 10/2013 | Jung | G02B 6/009 349/58 |
| 2004/0061965 A1 | 4/2004 | Cho et al. | |
| 2012/0092584 A1 * | 4/2012 | Jung | G02B 6/009 349/58 |
| 2015/0333285 A1 * | 11/2015 | Ogasawara | H01L 27/322 257/40 |
| 2016/0026030 A1 * | 1/2016 | Kang | G02F 1/133308 349/58 |
| 2016/0120043 A1 * | 4/2016 | Kim | B32B 5/02 362/97.1 |
| 2016/0377908 A1 * | 12/2016 | Shin | G02F 1/133308 349/58 |

(Continued)

FOREIGN PATENT DOCUMENTS

JP   2017-137081 A   8/2017
KR   1020040004768 A   1/2004

(Continued)

*Primary Examiner* — Courtney L Smith
*Assistant Examiner* — Rashen E Morrison
(74) *Attorney, Agent, or Firm* — Cantor Colburn LLP

(57) ABSTRACT

A display device includes a display panel; a bottom chassis in which the display panel is accommodated, the bottom chassis defining: a first surface adjacent to the display panel, a second surface opposing the first surface, and a hole extending from the first surface to the second surface; and an adhesive film removably attachable to the second surface of the bottom chassis, the adhesive film including a guide line forming an enclosed shape. The adhesive film attached to the second surface of the bottom chassis disposes the enclosed shape formed by the guide line of the adhesive film, overlapping the hole, and a minimum dimension of the enclosed shape formed by the guide line is greater than a dimension of the hole.

22 Claims, 9 Drawing Sheets

(56) References Cited

U.S. PATENT DOCUMENTS

2017/0227806 A1* 8/2017 Yamamoto ............ G02F 1/1339
2019/0080860 A1* 3/2019 Choi ................... H04M 1/0277
2019/0391617 A1* 12/2019 Shen .................... G11B 33/123

FOREIGN PATENT DOCUMENTS

| KR | 100468765 B1 | 1/2005 |
| KR | 1020080011960 A | 2/2008 |
| KR | 101340042 B1 | 12/2013 |

* cited by examiner

[FIG. 1]
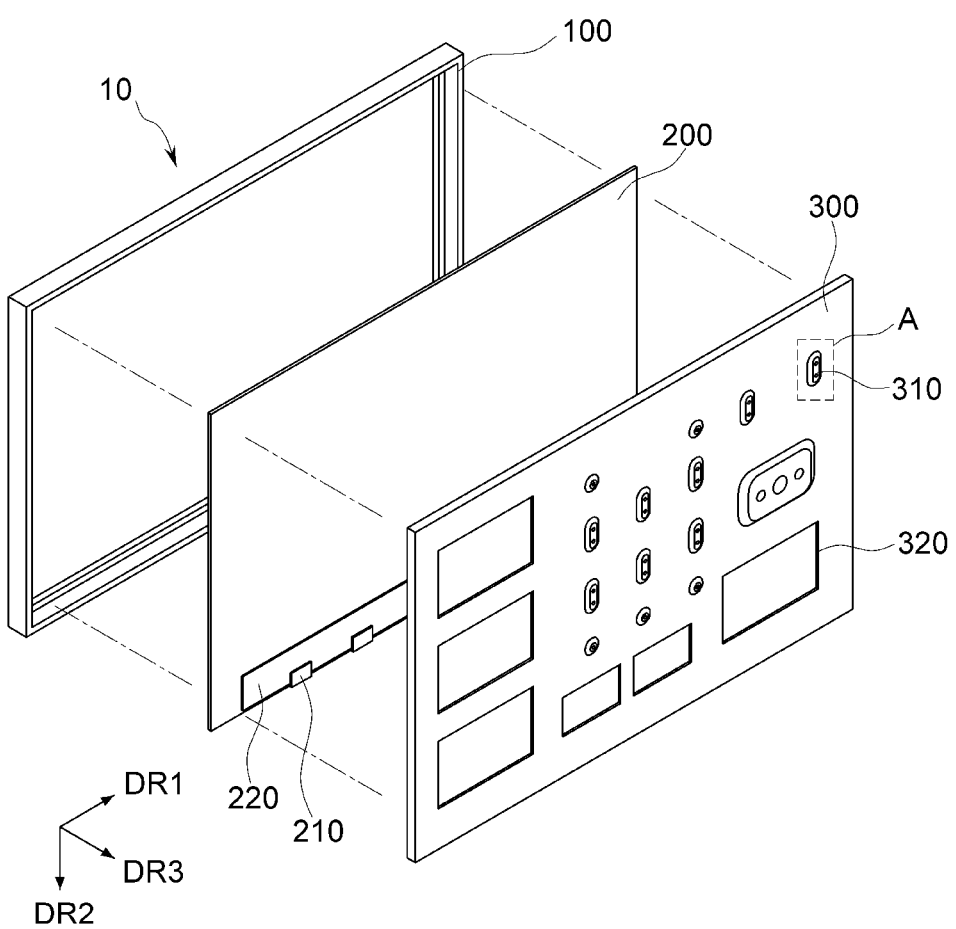

[FIG. 2]
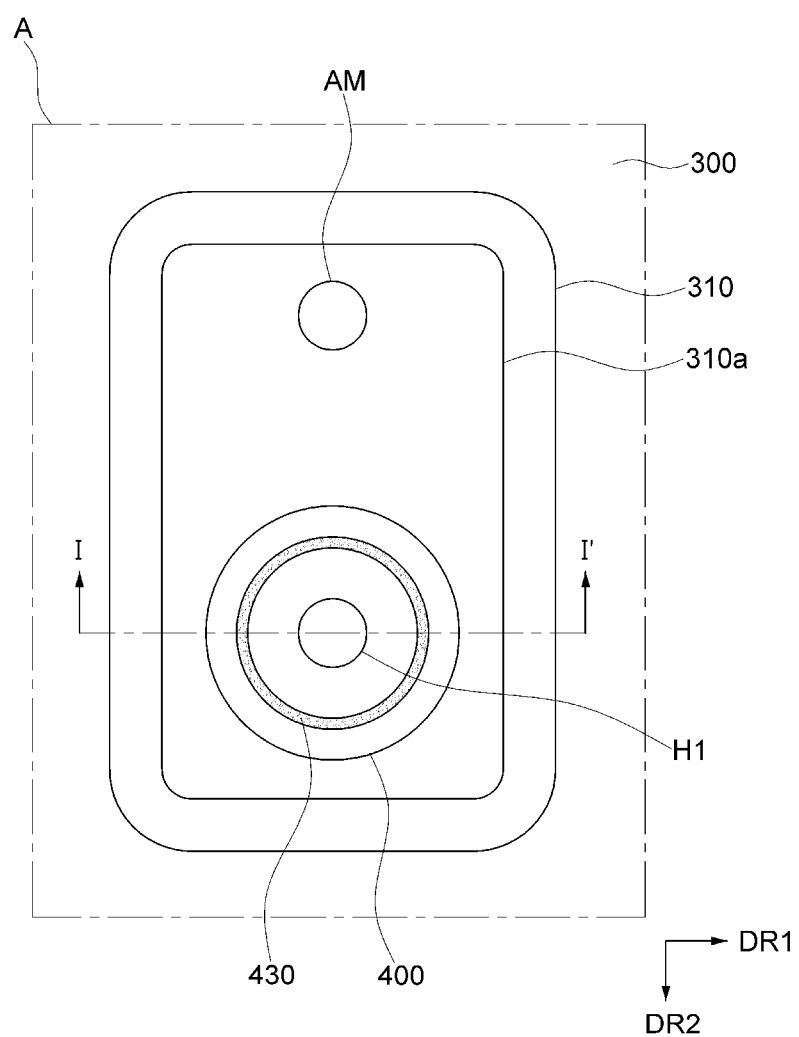

[FIG. 3]
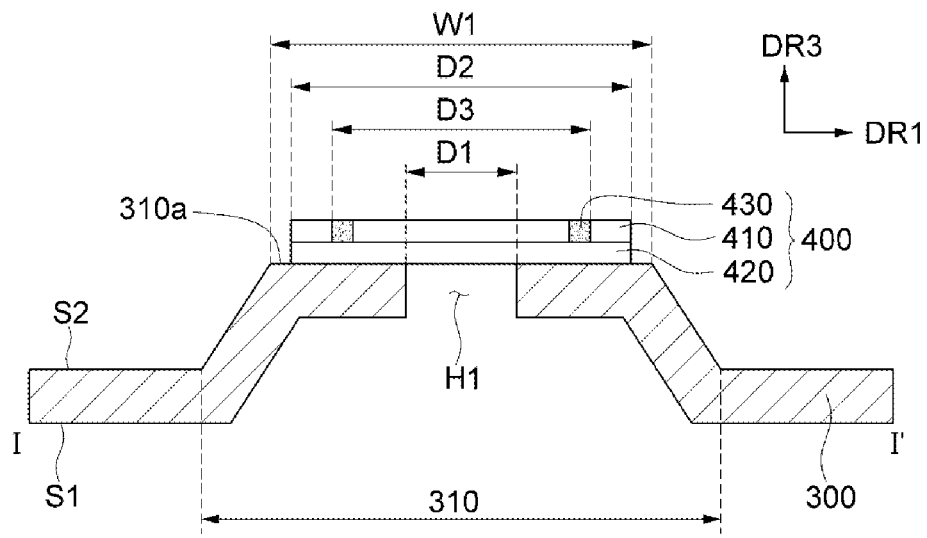
[FIG. 4]
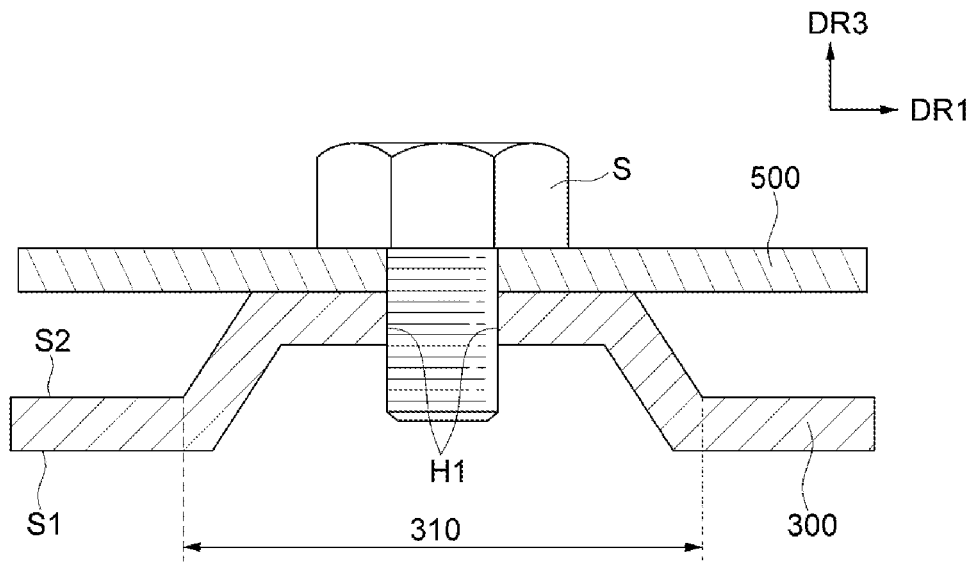

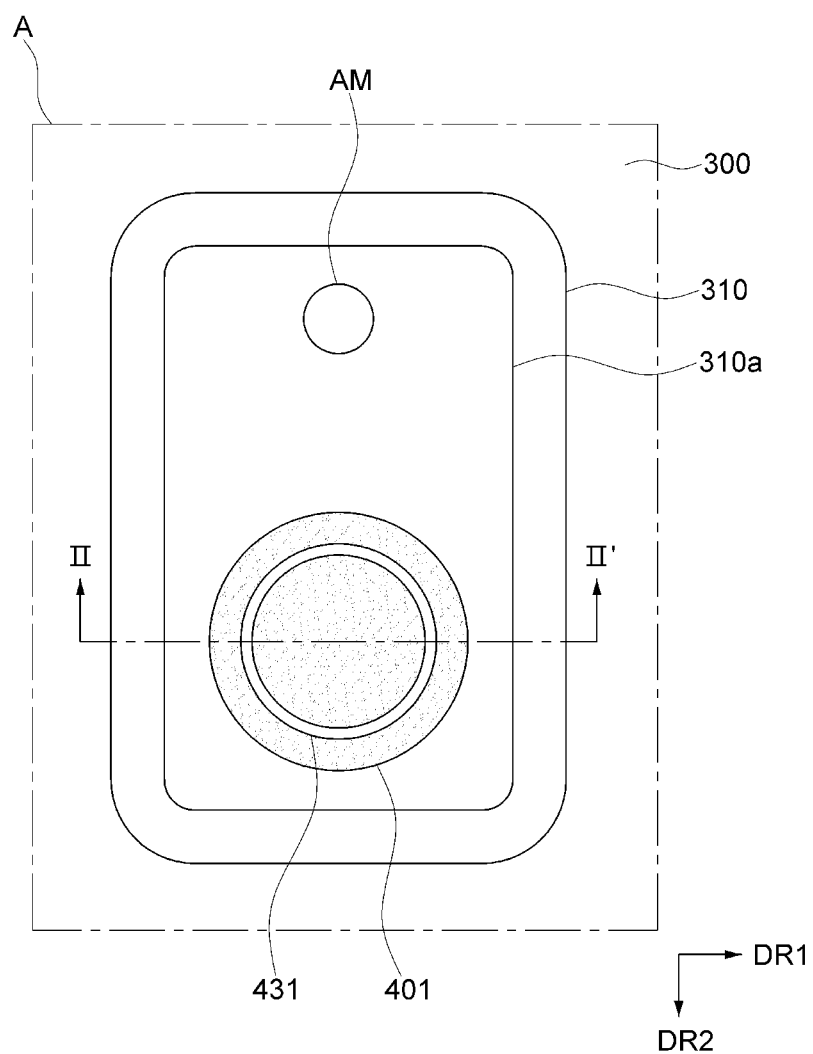
[FIG. 5]

[FIG. 6]
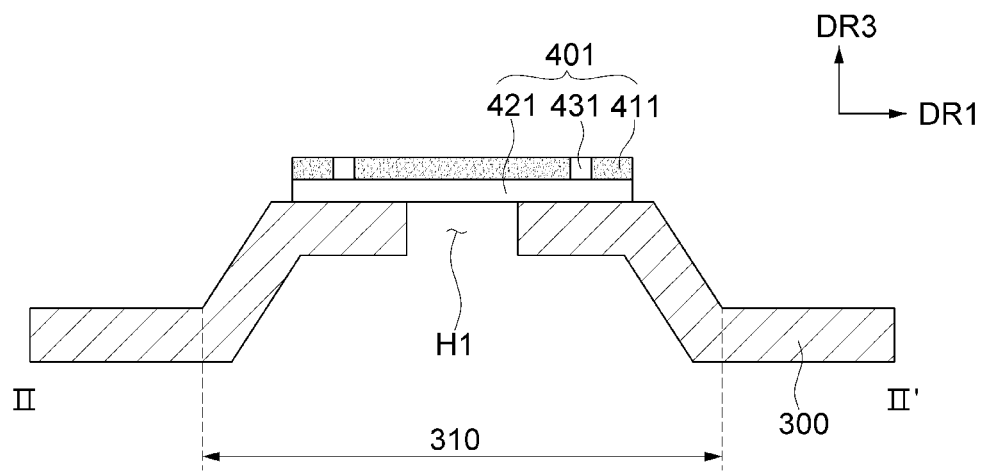

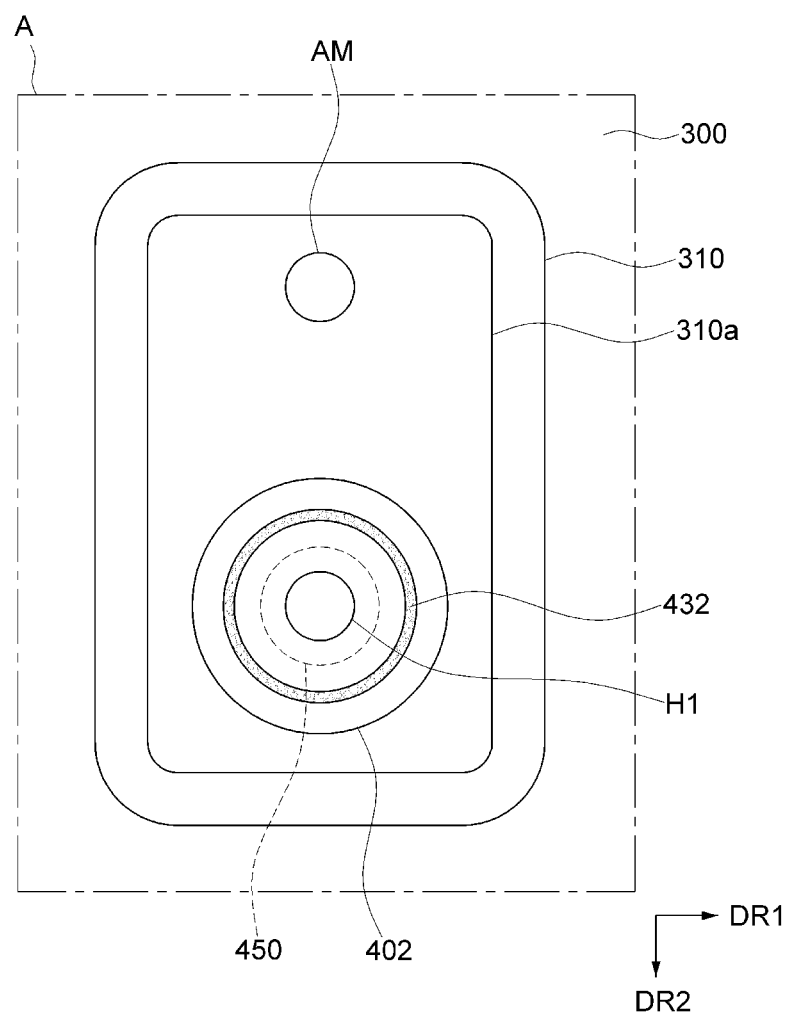

[FIG. 8]
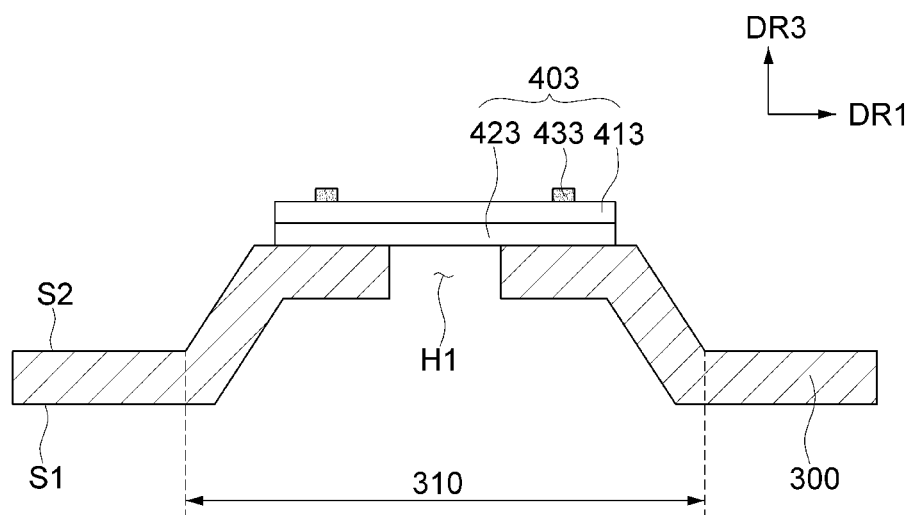

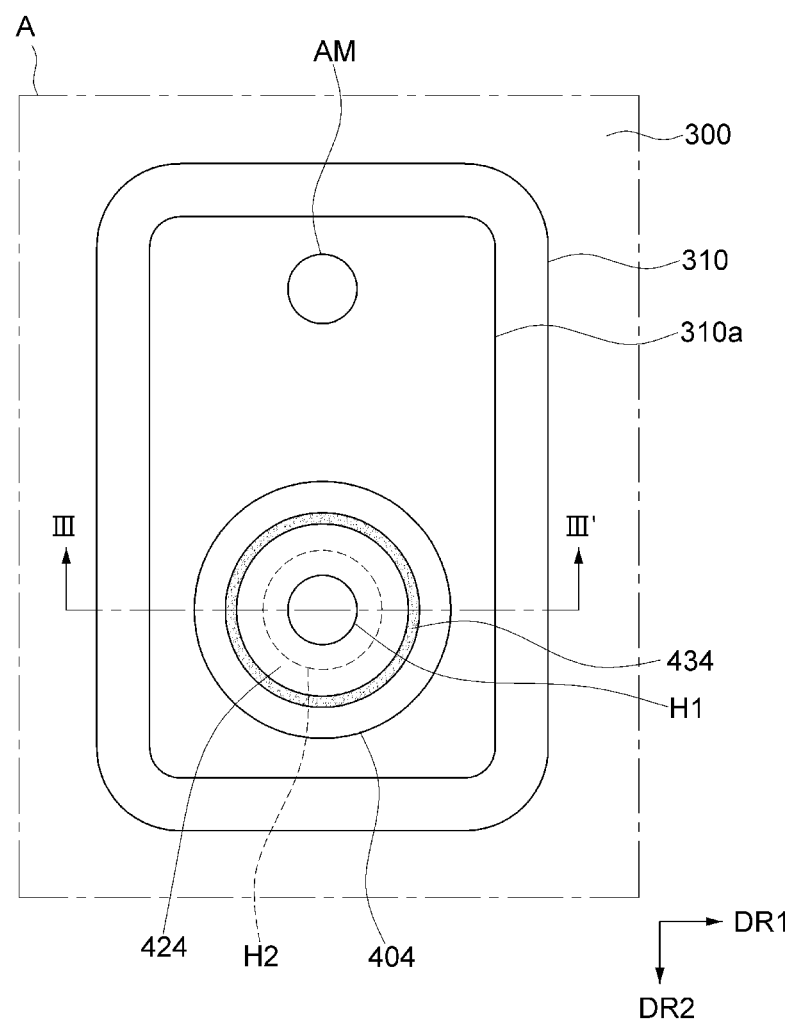

[FIG. 10]
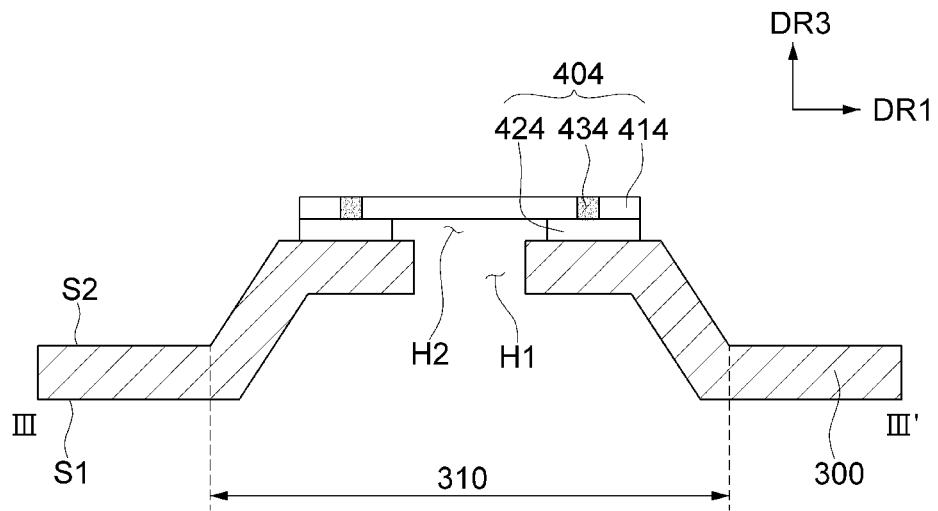
[FIG. 11]
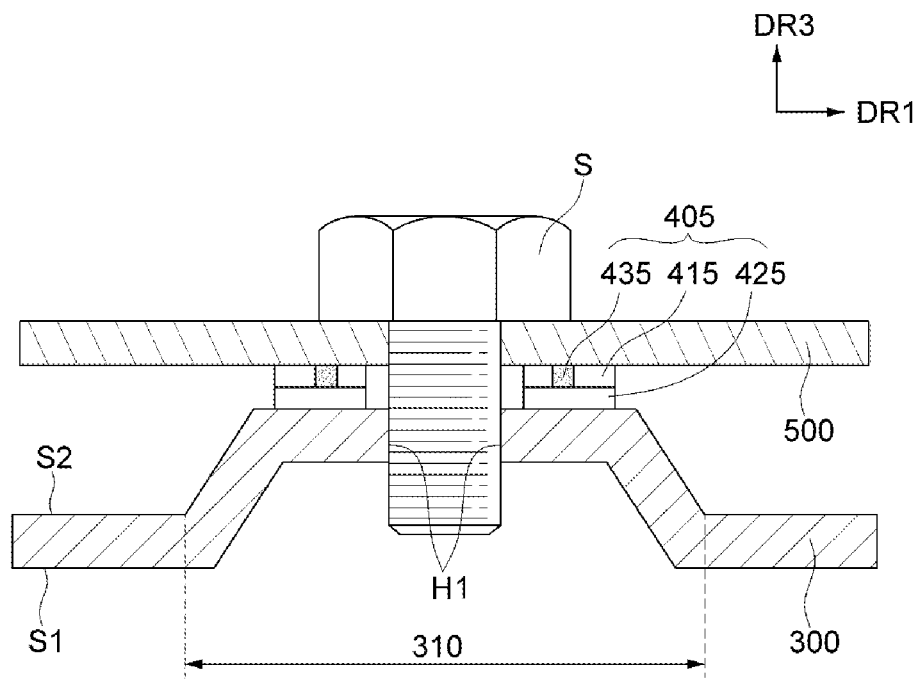

DISPLAY DEVICE

DISPLAY DEVICE

This application claims priority to Korean Patent Application No. 10-2018-0100226, filed on Aug. 27, 2018, and all the benefits accruing therefrom under 35 U.S.C. § 119', the disclosure of which is incorporated by reference herein in its entirety.

BACKGROUND

1. Field

Embodiments of the invention relate to a display device, and more particularly, to a display device including an adhesive film removably attachable to a bottom chassis.

2. Description of the Related Art

Display devices may be classified into liquid crystal display ("LCD") devices, organic light emitting diode ("OLED") display devices, plasma display panel ("PDP") devices, electrophoretic display devices, or the like based on a light emitting scheme thereof Such a display device includes a display panel and a bottom chassis for accommodating the display panel. The bottom chassis may have at least one hole with which an element, e.g., a system board, a reinforcement member, and a cover member is coupled to the bottom chassis.

SUMMARY

Embodiments of the invention may be directed to a display device capable of reducing or substantially preventing infiltration of foreign matters into a bottom chassis through a hole of the bottom chassis.

According to an embodiment, a display device includes: a display panel; a bottom chassis in which the display panel is accommodated, the bottom chassis defining: a first surface adjacent to the display panel, a second surface opposing the first surface, and a hole extending from the first surface to the second surface; and an adhesive film removably attachable to the second surface of the bottom chassis, the adhesive film including a guide line forming an enclosed shape. The adhesive film attached to the second surface of the bottom chassis disposes the enclosed shape formed by the guide line of the adhesive film, overlapping the hole, and a minimum dimension of the enclosed shape formed by the guide line is greater than a dimension of the hole.

The bottom chassis may include a protruding portion which protrudes in a direction from the first surface toward the second surface, and the hole may be defined through the protruding portion.

A portion of the second surface may define an upper surface of the protruding portion. A planar area of the adhesive film may be less than a planar area of the upper surface of the protruding portion.

Along a same direction, a dimension of the adhesive film may be less than a dimension of the upper surface of the protruding portion.

Along the same direction, a dimension of the enclosed shape formed by the guide line may be less than the dimension of the adhesive film.

The adhesive film may be transparent, and the guide line may be colored.

The adhesive film may be colored, and the guide line may be transparent.

The adhesive film may further include a cutting line at which a portion of the adhesive film within the cutting line is removable from a remainder of the adhesive film, the cutting line forming an enclosed shape.

Along a same direction, a dimension of the enclosed shape formed by the cutting line, may be greater than the dimension of the hole and less than a dimension of the enclosed shape formed by the guide line.

The adhesive film may include a base layer and an adhesive layer.

The guide line may protrude from the base layer.

A planar shape of the adhesive layer may be the same as a planar shape of the base layer.

The adhesive layer may have a ring shape overlapping an edge of the base layer.

The ring shape of the adhesive layer may extend around the hole to be disposed spaced apart from an outer edge of the hole.

The bottom chassis may further include a reinforcement member which protrudes in a direction from the second surface toward the first surface.

According to another embodiment, a display device includes: a display panel; a bottom chassis in which the display panel is accommodated, the bottom chassis defining: a first surface adjacent to the display panel, a second surface opposing the first surface, and a protruding portion which protrudes in a direction from the first surface toward the second surface, a portion of the second surface defining an upper surface of the protruding portion; and an adhesive film removably attachable to the upper surface of the protruding portion. The adhesive film includes a guide line forming an enclosed shape.

A planar area of the adhesive film may be less than a planar area of the upper surface of the protruding portion.

The bottom chassis may further define a hole in the protruding portion which extends from the first surface to the second surface, and the adhesive film attached to the upper surface of the protruding portion may dispose the enclosed shape formed by the guide line of the adhesive film overlapping the hole.

Along a same direction, a dimension of the enclosed shape formed by the guide line may be greater than a dimension of the hole and less than a dimension of the adhesive film.

The adhesive film may be colored, and the guide line may be transparent.

The foregoing is illustrative only and is not intended to be in any way limiting. In addition to the illustrative embodiments and features described above, further embodiments and features will become apparent by reference to the drawings and the following detailed description.

BRIEF DESCRIPTION OF THE DRAWINGS

A more complete appreciation of the invention will become more apparent by describing in detail embodiments thereof with reference to the accompanying drawings, where:

FIG. 1 is an exploded perspective view illustrating an embodiment of a display device;

FIG. 2 is an enlarged top plan view of area A in FIG. 1;

FIG. 3 is a cross-sectional view taken along line I-I' of FIG. 2;

FIG. 4 is a cross-sectional view illustrating an embodiment of a securing member in a hole of a bottom chassis of a display device;

FIG. 5 is an enlarged top plan view of another embodiment of area A in FIG. 1;

FIG. 6 is a cross-sectional view taken along line II-II' of FIG. 5;

FIG. 7 is an enlarged top plan view of still another embodiment of area A in FIG. 1;

FIG. 8 is a cross-sectional view illustrating another embodiment of an adhesive film relative to a protruding portion of a bottom chassis of a display device;

FIG. 9 is an enlarged top plan view of yet another embodiment of area A in FIG. 1;

FIG. 10 is a cross-sectional view taken along line III-III' of FIG. 9; and

FIG. 11 is a cross-sectional view illustrating another embodiment of a securing member in a hole of a bottom chassis of a display device.

DETAILED DESCRIPTION

Embodiments will now be described more fully hereinafter with reference to the accompanying drawings. Although the invention may be modified in various manners and have several embodiments, embodiments are illustrated in the accompanying drawings and will be mainly described in the specification. However, the scope of the invention is not limited to the embodiments and should be construed as including all the changes, equivalents and substitutions included in the spirit and scope of the invention.

In the drawings, thicknesses of a plurality of layers and areas are illustrated in an enlarged manner for clarity and ease of description thereof. When a layer, area, or plate is referred to as being related to another element such as being "on" another layer, area, or plate, it may be directly on the other layer, area, or plate, or intervening layers, areas, or plates may be present therebetween. Conversely, when a layer, area, or plate is referred to as being related to another element such as being "directly on" another layer, area, or plate, intervening layers, areas, or plates are absent therebetween. Further when a layer, area, or plate is referred to as being related to another element such as being "below" another layer, area, or plate, it may be directly below the other layer, area, or plate, or intervening layers, areas, or plates may be present therebetween. Conversely, when a layer, area, or plate is referred to as being related to another element such as being "directly below" another layer, area, or plate, intervening layers, areas, or plates are absent therebetween.

The spatially relative terms "below," "beneath," "lower," "above," "upper" and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device located "below" or "beneath" another device may be placed "above" another device. Accordingly, the illustrative term "below" may include both the lower and upper positions. The device may also be oriented in the other direction and thus the spatially relative terms may be interpreted differently depending on the orientations.

Throughout the specification, when an element is referred to as being "connected" to another element, the element is "directly connected" to, such as being in contact with, the other element, or "electrically connected" to the other element with one or more intervening elements interposed therebetween.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises," "including," "includes" and/or "including," when used in this specification, specify the presence of stated features, integers, steps, operations, elements and/or components, but do not preclude the presence or addition of one or more other features, integers, steps, operations, elements, components and/or groups thereof It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of variation for the particular value as determined by one of ordinary skill in the art, considering the measurement in question and the error associated with measurement of the particular quantity (i.e., the limitations of the measurement system). For example, "about" may mean within one or more standard variations, or within±30%, 20%, 10%, or 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Some of the parts which are not associated with the description may not be provided in order to in specific describe embodiments of the invention and like reference numerals refer to like elements throughout the specification.

A display device may include a display panel and a bottom chassis in which the display panel is accommodated.

The bottom chassis may have at least one hole with which an element, e.g., a system board, a reinforcement member, or a cover member is coupled to the bottom chassis. Problems such as foreign matters infiltrating into the bottom chassis through the hole of the bottom chassis may occur. As such, an improved display device which reduces or effectively prevents infiltration of foreign matters into a bottom chassis is desired.

Hereinafter, an embodiment of the invention will be described with reference to FIGS. 1 to 4.

FIG. 1 is an exploded perspective view illustrating an embodiment of a display device, FIG. 2 is an enlarged top plan view of area A in FIG. 1, and FIG. 3 is a cross-sectional view taken along line I-I' of FIG. 2.

A display device 10 may be an analog television ("TV"), a digital TV, a three-dimensional ("3D") TV, a smart TV, a light emitting diode ("LED") TV, an organic light emitting diode ("OLED") TV, a plasma TV, a quantum dot TV, a digital signage device (for example, including an LED display module or LED display modules in a matrix form) and/or a display monitor thereof. In addition, the display device 10 may be a mobile phone, a smart phone, an MP3 player, a video player, a tablet personal computer ("PC"), an electronic blackboard, and/or a wearable device including a display panel, which is wearable on a user's body.

In addition, the display device 10 may be realized as a flat panel display device, a curved display device with a constant curvature, a flexible display device with a plurality of curvatures, and/or a curvature-variable display device capable of changing a curvature of a current screen according to a user's input, but embodiments are not limited thereto.

Referring to FIG. 1, a display device 10 according to an embodiment includes a top chassis 100 (or an upper frame), a display panel 200, and a bottom chassis (or a lower frame) 300.

Hereinbelow, for ease of description, a direction along a relatively long side of the display device 10 will be referred to as a first direction DR1, a direction along a relatively short side of the display device 10 will be referred to as a second direction DR2, and a direction along a thickness of the display device 10 will be referred to as a third direction DR3. The first, second and third directions DR1, DR2 and DR3 cross each other, such as being perpendicular to each other, but not being limited thereto.

The top chassis 100 has an opening window for exposing an active area of the display panel 200 to the outside. An image may be displayed by the display panel 200 at the active area thereof. The top chassis 100 may be disposed to cover an edge of an upper surface of the display panel 200 and a side surface thereof. The top chassis 100 secures an upper edge of the display panel 200 to reduce or effectively prevent the display panel 200 from being dislocated within the display device 10. The top chassis 100 may form portions of an outer surface of the display device 10, such as at a front viewing side and side surfaces.

The top chassis 100 may be secured to the bottom chassis 300 such as by using a hook and/or a screw. In addition, although not illustrated, the display device 10 according to an embodiment may further include a mold frame, and the top chassis 100 may be secured to the mold frame such as by using a hook and/or a screw.

The top chassis 100 may include a relatively rigid metal material, e.g., stainless steel, or a material having relatively high heat dissipation characteristics, e.g., aluminum and an aluminum alloy. In addition, in an embodiment of manufacturing a display device, the top chassis 100 may be formed by, for example, a press molding process to have a predetermined curvature.

The display panel 200 generates and/or displays images. There is no particular limitation on the display panel 200. In an embodiment, for example, the display panel 200 may be a self-luminous display panel, e.g., an organic light emitting diode ("OLED") display panel, or a non-self-luminous display panel, e.g., a liquid crystal display ("LCD") panel, an electro-wetting display panel, an electrophoretic display panel, and a microelectromechanical system ("MEMS") display panel. When the non-self-luminous display panel is used, the display device 10 may further include a backlight unit for providing light to the display panel 200.

The display panel 200 includes a substrate as a base substrate, a pixel electrode disposed in plurality on the substrate, a thin film transistor connected to the pixel electrode and applying a driving voltage thereto, and various signal lines with which the pixel electrode and the thin film transistor are driven. One or more of these aforementioned features may be provided in plurality within the display panel 200 such as on the substrate thereof In addition, a driving circuit board 220 may be disposed on at least one side of the display panel 200. The driving circuit board 220 may apply driving signals to various signal lines included in the display panel 200 which are connected to pixels within the display panel 200. In an embodiment, for example, the driving circuit board 220 may be a gate driving circuit board that applies a scan signal or a data driving circuit board that applies a data signal.

The display panel 200 and the driving circuit board 220 are electrically connected to each other such as by at least one flexible printed circuit board ("FPCB") 210. A first end portion of the FPCB 210 overlaps a portion of the display panel 200 and is electrically connected to the display panel 200, and a second end portion of the FPCB 210 which is opposite to the first end portion thereof overlaps a portion of the driving circuit board 220 and is electrically connected to the driving circuit board 220. The FPCB 210 may be, for example, a chip on film ("COF") or a tape carrier package ("TCP"). The number of the FPCBs 210 may vary according to, for example, the size of the display panel 200 and the driving scheme thereof A driving chip may be disposed on at least one side of the FPCB 210. The driving chip may generate various driving signals for driving the display panel 200. A timing controller and a data driving circuit may be integrated into one chip to form the driving chip, and the driving chip may be represented by a driver integrated circuit ("IC") or a source IC.

The display device 10 which is assembled may dispose the plurality of FPCBs 210 attached to one side of the display panel 200 to be bent along a side wall of the bottom chassis 300, and the driving circuit board 220 may be disposed at the side wall or an edge of a rear surface of the bottom chassis 300.

The bottom chassis 300 maintains an overall framework of the display device 10, and accommodates the display panel 200 within a receiving space of the bottom chassis 300. The bottom chassis 300 may further accommodate therein, for example, the FPC board 210, the driving circuit board 220 and a power supply unit with which the display panel 200 is driven.

The bottom chassis 300 includes a first surface (or an accommodation surface) ("S1" in FIG. 3) adjacent to the display panel 200, and a second surface (or a rear surface) ("S2" in FIG. 3) that opposes the first surface S1. The display panel 200 may be accommodated in a space defined by the first surface S1 of the bottom chassis 300 and the side surface defined by a sidewall of the bottom chassis 300 which extends from the first surface S1. In addition, although not illustrated, the bottom chassis 300 may further accommodate therein at least one of a mold frame, a backlight unit, a light source unit, a reflective sheet, and an optical sheet, in addition to the display panel 200. Referring to FIG. 3, for example, a collective first surface S1 may include horizontal portions spaced apart from each other along the third direction DR3, and inclined portions which connect the horizontal portions each other.

The bottom chassis 300 may include a relatively rigid metal material, e.g., stainless steel, or a material having relatively high heat dissipation characteristics, e.g., aluminum and an aluminum alloy. In addition, in an embodiment of manufacturing a display device, the bottom chassis 300 may be formed by, for example, a press molding process to have a predetermined curvature. Particularly, an example of a material included in the bottom chassis 300 may include a relatively lightweight metal having a specific gravity of about 4 or less, e.g., magnesium, beryllium, titanium, alkali metals or alkaline earth metals. Examples of the material included in the bottom chassis 300 may include a nonferrous metal, rather than iron and iron-based alloys. The bottom chassis 300 may include a plastic material (e.g., polycarbonate ("PC")). In addition, the bottom chassis 300 may be formed by adding glass fiber to a plastic material.

Referring to FIGS. 1 to 3, the bottom chassis 300 according to an embodiment includes or defines a protruding portion 310 that protrudes along the third direction DR3 from a bottom portion of the bottom chassis 300. Referring to FIG. 3, for example, the bottom portion of the bottom chassis 300 is shown extending outward from a boundary (dotted lines in FIG. 3) of the protruding portion 310. In particular, the protruding portion 310 protrudes in the third direction DR3 from the first surface S1 of the bottom chassis 300 toward the second surface S2 of the bottom chassis 300. Referring to FIG. 3, portions of the first surface S1 disposed furthest along a direction opposite to the third direction DR3 may be disposed in a plane defined by the first and second directions DR1 and DR2 which intersect each other. The protruding portion 310 protrudes in a direction away from the display panel 200.

The bottom chassis 300 may include an alignment mark AM positioned on the protruding portion 310. The alignment mark AM may have a shape protruding from the protruding portion 310 in the third direction DR3 or may be engraved as a recess extending into a surface the protruding portion 310. However, in an embodiment, the alignment mark AM may be omitted.

The bottom chassis 300 has at least one of the hole H1 that is defined through a thickness of the protruding portion 310. Since the hole H1 is located at the protruding portion 310 of the bottom chassis 300, when a securing member S is inserted into the hole H1 of the bottom chassis 300, pressing or contacting of the securing member S to other components of the display device 10, e.g., the display panel 200 or the backlight unit, which are accommodated at the first surface S1 of the bottom chassis 300 may be reduced or substantially prevented.

FIG. 4 is a cross-sectional view illustrating an embodiment of the securing member S in the hole H1 of the bottom chassis 300.

Referring to FIG. 4, a system board 500 may be secured to the protruding portion 310 at the second surface S2 of the bottom chassis 300 using the securing member S, e.g., a screw. Specifically, an operator may remove an adhesive film 400 that is removably located at the hole H1 used for securing the system board 500, from the bottom chassis 300. Accordingly, with the adhesive film 400 removed, the hole H1 of the bottom chassis 300 is exposed to outside thereof, and the securing member S, e.g., a screw, is insertable into the hole H1 that is exposed so that the system board 500 and the bottom chassis 300 may be secured to each other. That is, a manufactured display device may dispose no portion of the adhesive film 400 between the bottom chassis 300 and elements secured to the bottom chassis 300 since the adhesive film 400 is completely removed. However, embodiments are not limited thereto.

At least one of an analog/digital ("A/D") board for receiving an image signal or an audio signal input from outside the bottom chassis 300 and/or the display device 10 to transmit the signal to, for example, the display panel 200 or a speaker, and controlling the image signal or the audio signal, an inverter for driving a light source of the backlight unit, an on screen display ("OSD") board for controlling functions related to screen adjustment, a speaker for outputting the input audio signal, an adapter for supplying a full power of the display device 10, and various cables may be mounted on the system board 500. Although it is described that the system board 500 is secured to the second surface S2 of the bottom chassis 300 according to an embodiment, embodiments are not limited thereto. Other components, e.g., a reinforcement member and a cover member, may be secured to the second surface S2 of the bottom chassis 300.

According to an embodiment, as the hole H1 is located at the protruding portion 310 of the bottom chassis 300, an end portion of the securing member S, e.g., a screw, may be spaced a predetermined distance apart from components accommodated at the first surface S1 of the bottom chassis 300, e.g., the display panel 200 or the backlight unit. Referring to FIG. 4, for example, a lowermost (distal end) of the securing member S is spaced apart from the plane defined by the portions of the first surface S1 disposed furthest along the direction opposite to the third direction DR3. Accordingly, contact of or pressure applied by the securing member S to the components accommodated at the first surface S1, e.g., the display panel 200 or the backlight unit may be reduced or substantially prevented.

Referring to FIG. 1, the bottom chassis 300 according to an embodiment may further include a reinforcement member 320. The reinforcement member 320 may protrude from or be depressed into the bottom portion of the bottom chassis 300, along the third direction DR3. In an embodiment, for example, the reinforcement member 320 may protrude in a direction from the second surface S2 of the bottom chassis 300 toward the first surface S1 of the bottom chassis 300, which is dissimilar to the protruding portion 310 that protrudes in a direction from the first surface S1 toward the second surface S2.

The reinforcement member 320 serves to increase overall rigidity of the bottom chassis 300, and may be provided in plurality spaced apart from each other along the first direction DR1 and/or the second direction DR2. As a depth of the reinforcement member 320 increases along the third direction DR3, both rigidity of the bottom chassis 300 and thickness of the display device 10 increase. Accordingly, the depth of the reinforcement member 320 may be appropriately adjusted in order to realize the display device 10 having relatively high rigidity and small thickness. In an embodiment of manufacturing a display device, the protruding portion 310 and the reinforcement member 320 of the bottom chassis 300 may be formed substantially simultaneously such as through a press molding process in which a shape of the bottom chassis 300 is molded.

Referring to FIGS. 2 and 3, a display device 10 according to an embodiment further includes adhesive film 400 that overlaps the hole H1 and is attached to the second surface S2 of the bottom chassis 300. The adhesive film 400 may be removably attached to the bottom chassis 300 at the hole H1.

The adhesive film 400 has a dimension that is greater than a dimension of the hole H1 along a plane. Such dimensions are hereinafter referred to as 'diameter', but are not limited thereto. Specifically, when the diameter of the hole H1 of the bottom chassis 300 is defined as a first diameter D1 and the diameter of the adhesive film 400 is defined as a second diameter D2, on a plane, the second diameter D2 is greater than the first diameter D1. In an embodiment, for example, the first diameter D1 may be in a range from about 2.5 millimeters (mm) to about 4.5 mm, and the second diameter D2 may be in a range from about 9.0 mm to about 13.0 mm. However, embodiments are not limited thereto.

Accordingly, the adhesive film 400 may be attached to the second surface S2 of the bottom chassis 300, completely covering the hole H1, and reduce or substantially prevent a foreign matter from infiltrating into the bottom chassis 300 through the hole H1. Since a foreign matter does not infiltrate into bottom chassis 300 through the hole H1, damage to components, e.g., the display panel 200 and the backlight unit, which are exposed to outside the bottom chassis 300 via the hole H1 may be reduced or substantially prevented, and accordingly, reliability of the display device 10 may be improved.

In addition, the adhesive film 400 according to an embodiment has a planar area less than a planar area of an upper surface 310a of the protruding portion 310. The upper surface 310a may include a portion of the second surface S2 and may disposed furthest along the third direction DR3 from the first surface S1. Specifically, when the diameter of the adhesive film 400 is defined as the second diameter D2 and a shortest width of the upper surface 310a of the protruding portion 310 is defined as a first width W1, on a plane, the second diameter D2 is less than the first width W1.

Accordingly, the adhesive film 400 is attached only to the upper surface 310a of the protruding portion 310 that is substantially flat, and is not attached to a surface having a concavo-convex structure, e.g., edge portions of the protruding portion 310 and the reinforcement member 320, and thus the adhesive film 400 may be attached to the bottom chassis 300 more stably.

In addition, one of the adhesive film 400 according to an embodiment may be attached corresponding to one of the hole H1 of the bottom chassis 300. Accordingly, a size of the adhesive film 400 may be substantially minimized, and manufacturing costs of the adhesive film 400 may be reduced.

The adhesive film 400 according to an embodiment includes a base layer 410 that has a guide line 430, and an adhesive layer 420.

The base layer 410 includes a light transmitting material that is transparent. The base layer 410 includes a material having relatively high flexibility, insulation, and heat resistance. In an embodiment, for example, the base layer 410 may include, for example, polyimide, an acrylic resin, and polyethylene terephthalate ("PET"), but embodiments are not limited thereto.

The adhesive layer 420 is positioned between the base layer 410 and the bottom chassis 300, to be closer to the bottom chassis 300 than the base layer 410. The adhesive layer 420 has a planar shape substantially the same as a planar shape of the base layer 410. That is, outer edges of the adhesive layer 420 and the base layer 410 may coincide with (e.g., be aligned with) each other. The adhesive layer 420 may include at least one of an acrylic resin, an epoxy resin, a fluororesin, and a Teflon™ brand resin.

The guide line 430 is disposed at the base layer 410. That is, the base layer 410 is mainly transparent except for the guide line 430. In an embodiment, for example, the guide line 430 may be formed by being printing on the base layer 410, or by adding, for example, a dye to the base layer 410. The guide line 430 is formed to have a color, which is dissimilar to the base layer 410 which is transparent. In an embodiment, for example, the guide line 430 may have a black color. However, embodiments are not limited thereto, and the guide line 430 may have various colors distinguished from the base layer 410 which is transparent.

The guide line 430 has a dimension (such as a diameter D3) that is greater than the diameter D1 of the hole H1 and less than the diameter D2 of the adhesive film 400. More specifically, when the diameter of the hole H1 of the bottom chassis 300 is defined as the first diameter D1, the diameter of the adhesive film 400 is defined as the second diameter D2, and the diameter of the guide line 430 is defined as the third diameter D3, on a plane, the third diameter D3 is greater than the first diameter D1 and less than the second diameter D2. In such an embodiment, although it is described that the diameter of the guide line 430 is an outer diameter on a plane, embodiments are not limited thereto. In an embodiment, the aforementioned diameter of the guide line 430 may have a median value between an inner diameter of the guide line 430 and the outer diameter of the guide line 430 on a plane. In an embodiment, for example, the first diameter D1 may be in a range from about 2.5 mm to about 4.5 mm, the second diameter D2 may be in a range from about 9.0 mm to about 13.0 mm, and the third diameter D3 may be in a range from about 5.0 mm to about 8.0 mm. However, embodiments are not limited thereto.

Each of the hole H1, the adhesive film 400, the guide line 430 and the protruding portion 310 define an enclosed shape in the top plan view. A planar area of the hole H1, the adhesive film 400, the guide line 430 and the protruding portion 310 may define the enclosed shape of the respective feature. An outer edge of the respective feature may define the enclosed shape. The enclosed shape may be a circle without being limited thereto.

The respective dimensions D1, D2, D3 and W1 discussed above may be defined by the closed shape of the feature. In an embodiment, for example, a minimum dimension of the enclosed shape formed by the guide line 430 (e.g., D3) may be greater than a dimension of the hole H1 (e.g., D1). The dimensions D1, D2, D3 and W1 discussed above with respect to FIG. 3 are shown taken along a same direction, e.g., the first direction DR1, without being limited thereto. That is, the relationship of the dimensions D1, D2, D3 and W1 discussed above may also be applicable along the second direction DR2.

Accordingly, when the adhesive film 400 is attached corresponding to the hole H1 of the bottom chassis 300, an operator may attach the adhesive film 400 so that the hole H1 is located within the guide line 430 during manufacturing of a display device. In addition, a location of the hole H1 of the bottom chassis 300 may be easily identified by checking the guide line 430 of the adhesive film 400 attached thereto.

In addition, since it is not necessary to form a separate alignment mark on the bottom chassis 300 in order to indicate the location to which the adhesive film 400 is to be attached, by using the adhesive film 400 having the guide line 430, manufacturing costs of the bottom chassis 300 may be reduced.

Hereinafter, another embodiment will be described with reference to FIGS. 5 and 6. The description of the same configuration as that of an embodiment of the invention will be omitted for the convenience of explanation.

FIG. 5 is an enlarged top plan view of another embodiment of area A in FIG. 1, and FIG. 6 is a cross-sectional view taken along line II-II' of FIG. 5.

Referring to FIGS. 5 and 6, an adhesive film 401 according to another embodiment includes a base layer 411 that has a guide line 431, and an adhesive layer 421. In such an embodiment, the adhesive film 401 according to another embodiment includes the base layer 411 that is mainly colored and the guide line 431 that is transparent, which is dissimilar to the adhesive film 400 of FIGS. 2 and 3 in which the base layer 410 is mainly transparent and the guide line 430 is colored.

In an embodiment, for example, the base layer 411 may be formed by being printed on a base substrate, or by adding, for example, a dye to the base substrate. In addition, the base layer 411 may have a black color for improving a light leakage problem that may occur through the hole H1 of the bottom chassis 300. However, embodiments are not limited thereto, and the base layer 411 may have various colors to be distinguished from the guide line 431.

On the other hand, the guide line 431 includes a light transmitting material that is transparent. Accordingly, by checking the guide line 431 which is transparent, an operator may attach the adhesive film 401 so that the hole H1 is located within the guide line 431 during manufacturing of a display device. In addition, a location of the hole H1 of the bottom chassis 300 may be easily identified by checking the guide line 431 of the adhesive film 401 attached thereto.

Hereinafter, still other embodiments of a display device will be described with reference to FIGS. 7 to 11. The description of the same configuration as that of previous embodiments will be omitted for the convenience of explanation.

FIG. 7 is an enlarged top plan view of still another embodiment of area A in FIG. 1.

Referring to FIG. 7, an adhesive film 402 according to still another embodiment further includes a cutting line 450 at which a portion of the adhesive film 402 is removable from a remainder thereof.

The cutting line 450 has a minimum dimension (such as a diameter) greater than a diameter of a hole H1 and less than a diameter of a guide line 432, on a plane. In an embodiment, for example, in order to insert a securing member ("S" in FIG. 4) into the hole H1 of the bottom chassis 300 during manufacturing of a display device, it is unnecessary for an operator to remove an entire portion of the adhesive film 402, and the operator may remove only a central portion of the adhesive film 402 that overlaps the hole H1 by using the cutting line 450 to indicate a position of the hole H1.

Accordingly, a manufactured display device may dispose at least a portion of the adhesive film 402 which remains after removing the central portion thereof between the bottom chassis 300 and elements secured to the bottom chassis 300. In such an embodiment, the adhesive film 402 may provide insulation and buffering effects between the bottom chassis 300 and elements secured to the bottom chassis 300.

FIG. 8 is a cross-sectional view illustrating another embodiment of an adhesive film relative to a protruding portion of a display device.

Referring to FIG. 8, an adhesive film 403 according to still another embodiment includes a base layer 413, an adhesive layer 423, and a guide line 433.

In such an embodiment, the guide line 433 is disposed on the base layer 413 to be outside thereof. That is, the guide line 433 protrudes from the base layer 413 in the third direction DR3. A color material may be patterned on the base layer 413 to form the guide line 433 as a protrusion, but embodiments are not limited thereto.

Accordingly, when the adhesive film 403 is attached corresponding to a hole H1 of the bottom chassis 300, an operator may attach the adhesive film 403 so that the hole H1 is located within the guide line 433 that protrudes from the base layer 413. In addition, a location of the hole H1 of the bottom chassis 300 may be easily identified by visually and tactually checking the guide line 433 of the adhesive film 403 attached thereto.

FIG. 9 is an enlarged top plan view of yet another embodiment of area A in FIG. 1, and FIG. 10 is a cross-sectional view taken along line III-III' of FIG. 9.

Referring to FIGS. 9 and 10, an adhesive film 404 according to still another embodiment includes a base layer 414, an adhesive layer 424, and a guide line 434.

In such an embodiment, the adhesive layer 424 has a ring shape that overlaps an edge portion of the base layer 414 on a plane. The ring shape extends around the hole H1 to be disposed spaced apart from an outer edge of the hole H1. That is, an outer edge portion of the adhesive layer 424 may have a shape substantially the same as a shape of the outer edge of the base layer 414 on a plane, and the adhesive layer 424 may have a hole H2 that corresponds to a hole H1 of the bottom chassis 300. Accordingly, the adhesive layer 424 does not overlap the hole H1 of the bottom chassis 300 in the third direction DR3. In an embodiment, for example, when the hole of the bottom chassis 300 is defined as a first hole H1 and the hole of the adhesive layer 424 is defined as a second hole H2, the second hole H2 may have a diameter greater than a diameter of the first hole H1 on a plane.

Accordingly, a portion of the bottom chassis 300 that immediately surrounds the hole H1 does not contact the adhesive layer 424, and an adhesive material does not remain at the portion of the bottom chassis 300 that immediately surrounds the hole H1 after the adhesive film 404 is removed from the bottom chassis 300. Accordingly, when a securing member ("S" in FIG. 4) is inserted into the hole H1, infiltration of a residual material from the adhesive layer 424 from the portion of the bottom chassis 300 immediately surrounding the hole H1 into the bottom chassis 300 may be reduced or substantially prevented. In addition, since a foreign matter does not infiltrate through the hole H1 of the bottom chassis 300, damage to components, e.g., the display panel 200 or the backlight unit, may be reduced or substantially prevented, and accordingly, the reliability of the display device 10 may be improved.

FIG. 11 is a cross-sectional view of another embodiment of a securing member in a hole H1 of display device.

Referring to FIG. 11, a system board 500 may be secured to a second surface S2 of the bottom chassis 300 using a securing member S, e.g., a screw. According to still another embodiment, at least a portion of an adhesive film 405 may be located between the second surface S2 of the bottom chassis 300 and the system board 500. The adhesive film 405 includes a base layer 415, an adhesive layer 425, and a guide line 435.

In an embodiment, for example, among initial portions of the overall adhesive film 405 that is located at a hole H1 used for securing the system board 500, an operator may remove only a center portion of the overall adhesive film 405 that overlaps the hole H1 from the bottom chassis 300. Accordingly, the hole H1 of the bottom chassis 300 is exposed to the outside by removal of the center portion of the initial adhesive film 405, and the securing member S, e.g., a screw, may be inserted into the hole H1 that is exposed, thereby connecting the system board 500 and the bottom chassis 300 to each other which disposes a remaining portion of initial adhesive film 405 therebetween. It is described that the system board 500 is secured to the second surface S2 of the bottom chassis 300, but embodiments are not limited thereto. In an embodiment, an element, e.g., a reinforcement member and a cover member, may be secured to the second surface S2 of the bottom chassis 300 using the securing member S instead of the system board 500 shown in FIG. 11.

According to one or more embodiment, at least a portion of an initial adhesive film 405 remains located between the bottom chassis 300 and the system board 500 in a manufactured display device such that the remaining portion of the adhesive film 405 may provide insulation and buffering effects between the bottom chassis 300 and the system board 500 assembled to each other.

As set forth hereinabove, a display device according to one or more embodiments may reduce or substantially prevent foreign matters from infiltrating into a bottom chassis, by including an adhesive film attached to a rear surface of the bottom chassis. Such attachment may be used in one or more embodiment of manufacturing a display device.

In addition, a display device according to one or more includes an adhesive film having a guide line, with which attachment of the adhesive film corresponding to a hole of the bottom chassis is made relatively easy, and thus costs for manufacturing a display device using the adhesive film may be reduced.

While the invention has been illustrated and described with reference to the embodiments thereof, it will be apparent to those of ordinary skill in the art that various changes in form and detail may be formed thereto without departing from the spirit and scope of the invention.

What is claimed is:

1. A display device comprising:
a display panel;
a bottom chassis in which the display panel is accommodated, the bottom chassis defining:
a first surface facing the display panel,
a second surface opposing the first surface, the second surface including an upper surface of the bottom chassis which is furthest from the display panel, and
a hole extending from the first surface to the second surface; and
an adhesive film removably attachable to the bottom chassis, at the upper surface of the bottom chassis, the adhesive film comprising an outer edge, and a guide line forming an enclosed shape spaced apart from the outer edge,
wherein
the adhesive film attached to the upper surface of the bottom chassis, disposes the enclosed shape formed by the guide line of the adhesive film, overlapping the hole, and
a minimum dimension of the enclosed shape formed by the guide line is greater than a dimension of the hole.

2. The display device of claim 1, wherein
the bottom chassis comprises a protruding portion which protrudes in a direction from the first surface toward the second surface, and
the hole of the bottom chassis is defined through the protruding portion thereof.

3. The display device of claim 2, wherein
the protruding portion includes an upper surface furthest from the display panel, the upper surface of the protruding portion defining the upper surface of the bottom chassis, and
a planar area of the adhesive film is less than a planar area of the upper surface of the protruding portion.

4. The display device of claim 3, wherein along a same direction, a dimension of the adhesive film is less than a dimension of the upper surface of the protruding portion.

5. The display device of claim 4, wherein along the same direction, a dimension of the enclosed shape formed by the guide line is less than the dimension of the adhesive film.

6. The display device of claim 1, wherein the adhesive film is transparent, and the guide line is colored.

7. The display device of claim 1, wherein the adhesive film is colored, and the guide line is transparent.

8. The display device of claim 1, wherein the adhesive film further comprises a cutting line at which a portion of the adhesive film within the cutting line is removable from a remainder of the adhesive film, the cutting line forming an enclosed shape.

9. The display device of claim 8, wherein along a same direction, a dimension of the enclosed shape formed by the cutting line, is greater than the dimension of the hole and less than a dimension of the enclosed shape formed by the guide line.

10. The display device of claim 1, wherein the adhesive film comprises a base layer and an adhesive layer which is closer to the bottom chassis than the base layer.

11. The display device of claim 10, wherein the guide line protrudes from the base layer in a direction away from the bottom chassis.

12. The display device of claim 10, wherein a planar shape of the adhesive layer and a planar shape of the base layer are the same.

13. The display device of claim 10, wherein the adhesive layer has a ring shape which overlaps an edge of the base layer.

14. The display device of claim 13, wherein the ring shape of the adhesive layer extends around the hole to be disposed spaced apart from an outer edge of the hole.

15. The display device of claim 1, wherein the bottom chassis further comprises a reinforcement member which protrudes in a direction from the second surface toward the first surface, the reinforcement member spaced apart from the hole in the bottom chassis.

16. A display device comprising:
a display panel;
a bottom chassis in which the display panel is accommodated, the bottom chassis defining:
a first surface facing to the display panel,
a second surface opposing the first surface, the second surface including an upper surface of the bottom chassis which is furthest from the display panel, and
a protruding portion which protrudes in a direction from the first surface toward the second surface, the protruding portion including an upper surface which is furthest from the display panel; and
an adhesive film removably attachable to the upper surface of the protruding portion,
wherein the adhesive film comprises an outer edge, and a guide line forming an enclosed shape spaced apart from the outer edge.

17. The display device of claim 16, wherein a planar area of the adhesive film is less than a planar area of the upper surface of the protruding portion.

18. The display device of claim 16, wherein
the bottom chassis further defines a hole in the protruding portion which extends from the first surface to the second surface, and
the adhesive film attached to the upper surface of the protruding portion, disposes the enclosed shape formed by the guide line of the adhesive film overlapping the hole.

19. The display device of claim 18, wherein along a same direction, a dimension of the enclosed shape formed by the guide line is greater than a dimension of the hole and less than a dimension of the adhesive film.

20. The display device of claim 16, wherein the adhesive film is colored, and the guide line is transparent.

21. The display device of claim 1, wherein an inner diameter of the enclosed shape formed by the guide line is greater than a diameter of the hole.

22. The display device of claim 21, wherein the guide line has a dimension between the outer edge of the adhesive film and a diameter of the hole in a plan view.

* * * * *